Patented Mar. 9, 1937

2,073,229

UNITED STATES PATENT OFFICE 2,073,229

PRINTING INK COMPOSITION

Ralph C. Shuey, Mountain Lakes, N. J., assignor to Bakelite Corporation, New York, N. Y., a corporation of Delaware No Drawing. Application May 11, 1935, Serial No. 21,069. In Great Britain October 15, 1932

13 Claims. (Cl. 134—26)

This invention relates to printing inks and similar compositions consisting of pigmenting material incorporated in vehicles and to their preparation. More particularly the invention relates to printing inks to be applied to a printing surface and thereby to paper or equivalent sheet material.

The better grades of ink generally include as a vehicle a heat-bodied linseed oil known to the trade as a "varnish", for the ink must have sufficient fluidity or plasticity, and adhesion, to be applied to a printing surface and be lifted from the surface when pressed against the paper. After its application the ink should dry to a non-smearing and adherent film. It is desirable of course that the drying time be reduced as much as possible so that the printed sheets can be handled expeditiously. Driers are therefore generally included. But even when driers are included, it is found advisable as a rule with inks employing plain linseed oil varnish, to leave a stack of sheets to dry overnight in order to avoid smearing. This is especially true of the better grades of work, such as color printing.

I have found that satisfactory printing inks with a greatly shortened drying time can be prepared provided the linseed oil or equivalent drying oil employed in the vehicle has been bodied in conjunction with a suitable synthetic condensation product of the phenolic type that is characterized by oil solubility. Phenolic resins generally can be made oil-soluble by cooking with rosin for an extended period; as a rule a major proportion of rosin is required to impart the oil-soluble characteristic. There are phenolic resins, however, which have the oil-soluble characteristic without necessitating the inclusion of rosin. The latter I find to be preferable for the reason, among others, that the acceleration of the drying of the linseed oil can in general be attributed to the phenolic resin content and not to rosin; the proportion of undiluted phenolic resin required for a given effect is therefore correspondingly less.

Resins of the phenolic type that form homogeneous compositions with drying fatty oils, and therefore known as oil-soluble, can be obtained by reacting a xylenol, or an alkyl-substituted phenol of greater molecular weight (and generally substituted in the para or ortho positions) or a phenyl-substituted phenol, with formaldehyde, acetaldehyde, benzaldehyde or other aldehyde or ketone, as acetone, or similar compound characterized by having a reactive methylene (including substituted methylene) group. They are also obtained when a fatty oil is reacted with a phenol, and a resin is produced from the resulting product by means of an aldehyde; these reaction products including oil as a reagent are also found to be the equivalents of phenolic resin and oil solutions in the manufacture of inks and can be used in place thereof.

Phenolic condensation products are unlike driers so-called in their effect upon the inks. Driers are metallic catalysts which accelerate the rate of oxygen absorption by the varnish in the inks. The amount of drier required varies over wide limits, from none (in an ink containing a pigment which, itself, acts as a drying catalyst) to a relatively high proportion (in an ink containing a pigment which tends to inhibit oxidation of the varnish). The maximum quantity of drier which can to advantage be added to an ink is determined by the failure of further additions to decrease drying time. Furthermore, when the proportion of driers used is sufficiently great to obtain a minimum of drying time the film produced is not as stable as that obtained when lesser proportions of driers are used. Excessive oxidation is deleterious to the flexibility, toughness and chemical resistance of the film. The phenolic products, on the other hand, do not cause deterioration of, but enhance these film characteristics. By including phenolic products in the varnish, drying time is radically shortened without use of dangerous proportions of driers. In fact small amounts of driers are recommended for use in these varnishes since such small quantities suffice to give exceptionally rapid drying. When phenolic products are included, high percentages of driers give only a slight increase in drying speed on the printed sheets and serve to promote undesirable drying on the printing press. It is accordingly concluded that the drying action is largely a polymerization of the oil and not an oxidation. Such a conclusion is further fortified by the observation that stacked sheets printed with an ink whose vehicle has a suitable addition of phenolic condensation product dry in a small fraction of the time required for those printed with an ink including a drier but omitting the phenolic resin.

The viscosity desired in printing inks varies from a free-flowing liquid (for wick feeding) to an almost solid mass (for use on hot dies); the process of printing to be followed (typographic, planographic, intaglio), the type of press, the intended use of the printed matter, the grade of paper, fabric, etc., are determinants of the viscosity and other properties of the ink. The various viscosities of inks as dictated by their intended application are controlled by the viscosity of the varnish, oil absorption of the pigment, and pigment to vehicle ratio. The viscosity of the varnish in turn is governed by the resin content and by the heat or oxidizing treatment employed in its bodying. Linseed oil (most commonly used) is, for example, given a heat-treatment or is subjected to oxidation to supply the viscosity demanded; the oil bodied by heating may vary from a thin (No. 00000) to heavy varnish (No. 8); also oil bodied by air-blowing can be had of any desired viscosity. The effectiveness of a small percentage of oil-soluble phenolic resin, 5 per cent and even as low as one per cent, in improving a drying oil ink is very marked; but normally the greater the amount of resin the better the ink becomes from the standpoint of quick drying, gloss, freedom from smudging, etc., up to equal weights of the resin and the oil (or even no oil addition at all where the oil is a reactant in forming the resin). The amount of pigment to be employed in an ink is dependent on the oil absorption and tinctorial strength of the pigment and to some extent on the required viscosity of the ink; in general, pigment content varies from 20 per cent to 80 per cent by weight. Accordingly it is apparent that proportions are variable within a very wide range.

As pigments or coloring materials, the various organic and inorganic pigments and dyes commonly used can be included. These include: carmine, cochineal, etc., of animal origin; logwood, indigo, madder, tumeric, etc., of vegetable origin; artificial pigments as naphthol yellow, alkali blue, alizarine red, etc.; natural inorganic pigments as umber, sienna, ochre, clay, Indian red, etc.; artificial inorganic pigments as carbon black, lamp black, iron blue, chrome yellow, vermillion, bronze powder, aluminum powder, etc.; and dyes such as methyl violet, Victoria blue, Victoria green, etc.

For some purposes, such as rotogravure work, it is desirable to have an ink diluted or extended by a solvent that will remain in the ink and yet be rapidly removed after the printing operation. I have found that tetralin (tetrahydronaphthalene) and similar hydrogenated ring compounds are very effective solvents and are compatible with ink compositions containing phenolic resins. Tetralin for instance has a high boiling point (over 200° C.) and is only slowly volatilized from the mass of ink at ordinary room temperatures; there is therefore little tendency for the ink to change in composition before use. When applied to paper, however, the thinned vehicle is readily absorbed and the attendant increased surface exposure provides greatly increased evaporation of the solvent and oxidation of the varnish, thus giving a quick drying ink. Other suitable solvent are the aromatic esters such as benzyl benzoate, aromatic alcohols as benzyl alcohol, higher aliphatic alcohols as secondary butyl alcohol, etc., dimethyl phthalate, diethyl phthalate, etc. diethyl oxalate, etc., xylol, amyl benzene, etc., amyl ether, cellosolve (ethylene glycol monoethyl ether), carbitol (diethylene glycol monoethyl ether), etc. Also for more general applications in addition to rotogravure work lower boiling point solvents having compatibility and suitable evaporation rates can be used.

Specific examples of the invention follow; but it is to be understood that they are illustrative only and do not determine the scope of the invention.

*Example 1.*—A phenol resin for ink composition typical of this invention is prepared by reacting a phenolic body, such as phenyl-phenol, with formaldehyde or other methylene-containing agent to a resinous stage. Products prepared from phenyl-phenols possess the oil-soluble property. About 1 part by weight of such a product is cooked with about 3 parts, more or less, of linseed oil for about 15 minutes at 400° F. or thereabouts, or until a homogeneous mass is obtained. The vehicle so made has incorporated with it pigment, etc., to make the ink.

In the preparation of inks from the above described vehicle one pigment selected, namely peacock blue, gels very readily in an oil that has been heat-bodied. The presence of phenolic resin in the oil apparently overcame the gelling tendency, whereas, it is common experience that natural resins thus employed have the contrary effect; viz, that of increasing the tendency to gel. The inclusion in the ink of about 5 per cent of a lead-manganese drier (about half of the normal quantity) gave an ink which when printed on paper dried in about twenty minutes to a condition permitting the sheets to be handled.

The foregoing Example 1 describes an aryl-substituted phenol product; condensation products made from alkyl-substituted phenols can likewise be used as disclosed by the following Examples 2 and 3.

*Example 2.*—A phenyl-phenol condensation product, prepared as above by reaction in substantially equimolecular proportion of a phenyl-phenol with formaldehyde or equivalent methylene-containing agent, is mixed with one prepared from an alkyl-substituted phenol as amyl-phenol by reaction in substantially equimolecular proportions of formaldehyde or equivalent; the products are mixed in the proportions say of 60 parts of the phenyl-phenol product and 40 parts of the amyl-phenol product. Of this mixture 1 part is dissolved in 1 part of tetralin and to the solution is added 1 part of blown soya bean oil. This composition requires no heating for its viscosity after mixing is found to be such as to make it a suitable printing ink vehicle; heat can be applied, however, to raise its viscosity if desired or to permit the inclusion of more oil. Small amounts of drier as in the foregoing can be added if desired.

*Example 3.*—A product prepared from amyl phenol as described in the foregoing example is brought into solution with tung oil in the proportions of 1 part to 2 parts of oil; this is heated at 450 to 525° F. for about 5 minutes. There is then added 1 part of benzyl benzoate. This proportion gives a solution with a viscosity suitable for a vehicle without further heating and to which pigment can be added for preparing an ink; driers can be included if desired.

For rotogravure and similar work a satisfactory ink can be obtained by substituting for the linseed oil and phenolic resin mixture in the solvent a composition of homogeneous nature obtained by reacting a phenolic body with a fatty oil and thereupon causing a condensation of the product with formaldehyde, hexamethylenetetramine or other methylene-containing agent; such compositions are described in a patent by Byck No. 1,590,079 of June 22, 1926. Likewise resinous compositions with oil-soluble and air-drying properties are described in a patent to Turkington No. 1,677,417, granted July 17, 1928.

*Example 4.*—As an example of such a composition a product is prepared in accordance with Example 6 of the Turkington patent from 400 parts of tung oil, 250 parts of cresol, 250 parts of 37% formaldehyde solution, 150 parts of resin and 4 parts of hexamethylenetetramine. The product is heated until it reaches a temperature of about 320° F. and is dissolved while hot in an equal weight of tetralin; the solution is heated for about ¼ hour at 375–400° F.; when cooled, pigment with or without drier is included.

*Example 5.*—In place of tetralin a like amount of benzyl benzoate is substituted in Example 4 and the heating of the solution carried on for about ½ hour at 425–430° F. to reach the desired viscosity; such a solvent is particularly useful with a heated press. Benzyl alcohol can be used instead under substantially the same operating conditions for preparing the ink.

*Example 6.*—One part of a phenyl-phenol condensation product is dissolved in 4 parts of linseed oil and the solution heated for about 20 minutes at 580° F. One part of the solution so prepared is heated with 1 part of a product which is about 60 per cent reacted oil following Example 6 of the Turkington patent for about 1 hour at 320° F. No solvent is required and pigment with or without drier can be added directly to give a rapid drying printing ink.

The foregoing described vehicles when mixed with the required amounts of pigment commonly used give inks of about the same consistency as the customary heat-bodied linseed oil inks but they set more quickly. In addition the ink so made has a much higher gloss and greater pigment-binding strength than the plain linseed varnish ink. These effects are so marked that the proportion of phenolic resin to oil can be much lower than that stipulated above and yet give an ink of higher gloss and greater pigment-binding strength than are obtained with plain heat-bodied linseed oil inks. There is the further economical advantage that oils which are less expensive than linseed oil can be used in preparing the compositions and in fact tung oil for example is found equal if not superior to linseed oil; other oils such as soya bean, perilla, etc., are likewise satisfactory substitutes. Blends of various oils can be used in preparing the vehicle; for example a relatively small proportion of one oil, such as tung oil, is bodied with an oil-soluble phenolic resin, and this composition is then blended in the cold with a large proportion of linseed oil.

This application is a continuation-in-part of the copending application Serial No. 497,600 filed November 22, 1930.

I claim:

1. In a printing ink prepared by incorporating from about 20 to 80 per cent of pigment in a vehicle of the drying oil type and dependent for solidification in part at least upon the drying of the oil content of the vehicle, the improvement comprising a vehicle containing a drying oil, an oil-soluble reaction product of a phenol with an agent having a reactive methylene group, said product constituting from approximately one to fifty per cent or about by weight of the vehicle and having an accelerating effect on the solidification of the drying oil, and a solvent compatible with the other constituents of said vehicle and characterized by slow volatility at ordinary room temperatures in proportion to produce an ink having a consistency suitable for transfer by a printing surface with but little tendency to change before application and drying with rapidity after its application through the solidification-accelerating action of the resin on the drying oil.

2. In a printing ink prepared by incorporating from about 20 to 80 per cent of pigment in a vehicle of the drying oil type and dependent for solidification in part at least upon the drying of the oil content of the vehicle, the improvement comprising a vehicle containing a drying oil together with an oil-soluble reaction product of a phenol with an agent having a reactive methylene group, said product constituting from approximately one to fifty per cent or about by weight of the vehicle and having an accelerating effect on the solidification of the drying oil, the vehicle being in proportion to produce an ink having a consistency suitable for transfer by a printing surface with but little tendency to change before application and drying with rapidity after its application through the solidification-accelerating action of the resin on the drying oil.

3. In a printing ink prepared from a pigment and a vehicle of the drying oil type and dependent at least in part for solidification upon the drying of the vehicle, the improvement comprising a vehicle containing a drying oil, an oil-soluble reaction product of a phenol with an agent having a reactive methylene group, said product being present in amount to accelerate solidification of said drying oil, and a solvent compatible with the other constituents of said vehicle and characterized by slow volatility at ordinary room temperatures in proportion to produce an ink having a consistency suitable for transfer by a printing surface with but little tendency to change before application and drying with rapidity after its application through the solidification-accelerating action of the resin on the drying oil.

4. In a printing ink prepared from a pigment and a vehicle of the drying oil type and dependent at least in part for solidification upon the drying of the vehicle, the improvement comprising a vehicle containing a drying oil, an oil-soluble reaction product of a hydrocarbon-substituted phenol with an agent having a reactive methylene group, said product being present in amount to accelerate solidification of said drying oil, and a solvent compatible with the other constituents of said vehicle and characterized by slow volatility at ordinary room temperatures in proportion to produce an ink having a consistency suitable for transfer by a printing surface with but little tendency to change before application and drying with rapidity after its application through the solidification-accelerating action of the resin on the drying oil.

5. In a printing ink prepared from a pigment and a vehicle of the drying oil type and dependent at least in part for solidification upon the drying of the vehicle, the improvement comprising a vehicle containing a drying oil, an oil-soluble reaction product of a phenyl-substituted phenol with an agent having a reactive methylene group, said product being present in amount to accelerate solidification of said drying oil, and a solvent compatible with the other constituents of said vehicle and characterized by slow volatility at ordinary room temperatures in proportion to produce an ink having a consistency suitable for transfer by a printing surface with but little tendency to change before application and drying with rapidity after its application through the solidification-accelerating action of the resin on the drying oil.

6. In a printing ink prepared from a pigment and a vehicle of the drying oil type and dependent at least in part for solidification upon the drying of the vehicle, the improvement comprising a vehicle containing a drying oil, an oil-soluble reaction product of a phenol with an agent having a reactive methylene group, said product being present in amount to accelerate solidification of said drying oil, and a solvent comprising a hydrogenated ring compound compatible with the other contstituents of said vehicle and characterized by slow volatility at ordinary room temperatures in proportion to produce an ink having a consistency suitable for transfer by a printing surface to paper with but little tendency to change before application and drying with rapidity after its application through the solidification-accelerating action of the resin on the drying oil.

7. In a printing ink prepared from a pigment and a vehicle of the drying oil type and dependent at least in part for solidification upon the drying of the vehicle, the improvement comprising a vehicle containing a drying oil, an oil-soluble reaction product of a phenol with an agent having a reactive methylene group, said product being present in amount to accelerate solidification of said drying oil, and tetralin in proportion to produce an ink having a consistency suitable for transfer by a printing surface with but little tendency to change before application and drying with rapidity after its application through the solidification-accelerating action of the resin on the drying oil.

8. In a printing ink prepared from a pigment and a vehicle of the drying oil type and dependent at least in part for solidification upon the drying of the vehicle, the improvement comprising a vehicle containing the reaction product of a drying oil, a phenol and an agent having a reactive methylene group, and a solvent compatible with the other constituents of said vehicle and characterized by slow volatility at ordinary room temperatures in proportion to produce an ink having a consistency suitable for transfer by a printing surface with but little tendency to change before application and drying with rapidity after its application through the solidification of said drying oil-phenol-aldehyde reaction product.

9. In a printing ink prepared from a pigment and a vehicle of the drying oil type dependent at least in part for solidification upon the drying of the vehicle, the improvement comprising a vehicle containing a drying oil and an oil-soluble reaction product of a phenol with an agent having a reactive methylene group, said product being present in amount to accelerate solidification of said drying oil, the vehicle being in proportion to produce an ink having a consistency suitable for transfer by a printing surface with but little tendency to change before application and drying with rapidity after its application through the solidification-accelerating action of the resin on the drying oil.

10. In a printing ink prepared from a pigment and a vehicle of the drying oil type and dependent at least in part for solidification upon the drying of the vehicle, the improvement comprising a vehicle containing a drying oil and an oil-soluble reaction product of a hydrocarbon-substituted phenol with an agent having a reactive methylene group, said product being present in amount to accelerate solidification of said drying oil, the vehicle being in proportion to produce an ink having a consistency suitable for transfer by a printing surface with but little tendency to change before application and drying with rapidity after its application through the solidification-accelerating action of the resin on the drying oil.

11. In a printing ink prepared from a pigment and a vehicle of the drying oil type and dependent at least in part for solidification upon the drying of the vehicle, the improvement comprising a vehicle containing a drying oil and an oil-soluble resinous reaction product of a phenyl-substituted phenol with an agent having a reactive methylene group, said product being present in amount to accelerate solidification of said drying oil, the vehicle being in proportion to produce an ink having a consistency suitable for transfer by a printing surface with but little tendency to change before application and drying with rapidity after its application through the solidification-accelerating action of the resin on the drying oil.

12. In a printing ink prepared from a pigment and a vehicle of the drying oil type, and dependent at least in part for solidification upon the drying of the vehicle, the improvement comprising a vehicle containing the reaction product of a drying oil, a phenol and an agent having a reactive methylene group, the vehicle being in proportion to produce an ink having a consistency suitable for transfer by a printing surface with but little tendency to change before application and drying with rapidity after its application through the solidification of said drying oil-phenol-aldehyde reaction product.

13. A printing ink comprising a pigment characterized by gelling in a drying oil when heat bodied and a vehicle therefor including a drying oil dependent at least in part upon the oil for solidification and having present therein an oil-soluble reaction product of a phenol with an agent having a reactive methylene group whereby the gelling effect of the pigment upon the drying oil is overcome in the bodying of the oil by heating.

RALPH C. SHUEY.